Oct. 28, 1958   E. R. TENGBERG   2,858,109
MASONRY DRILL AND STARTER
Filed April 8, 1957
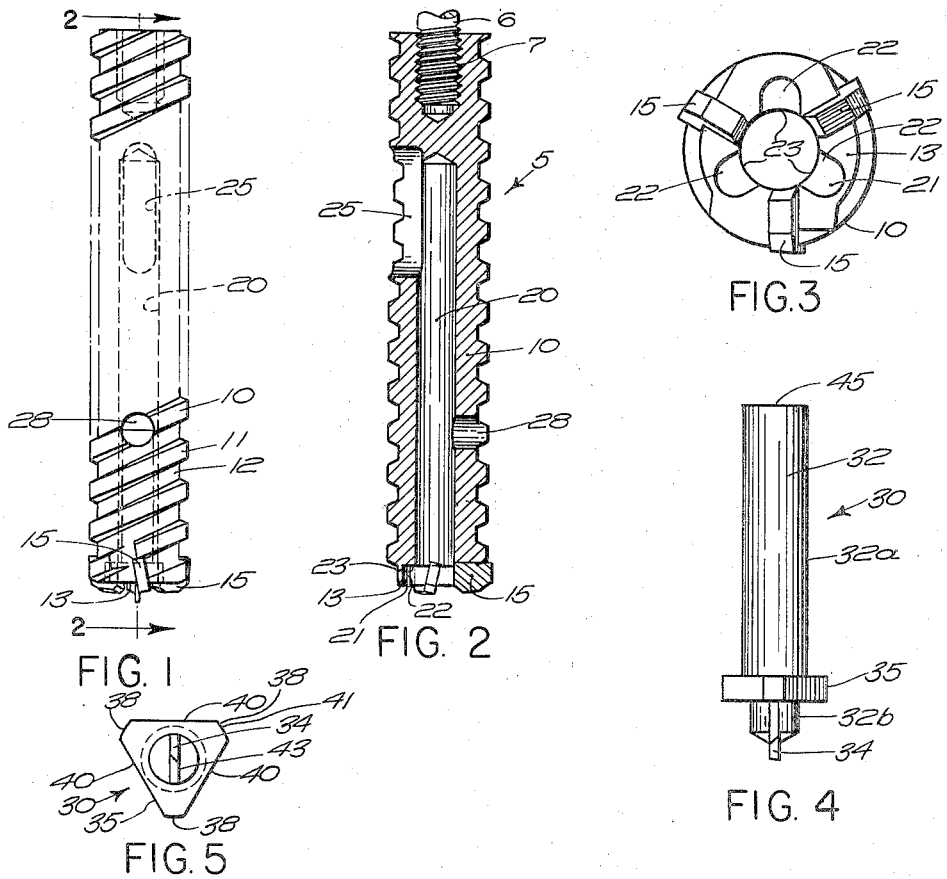
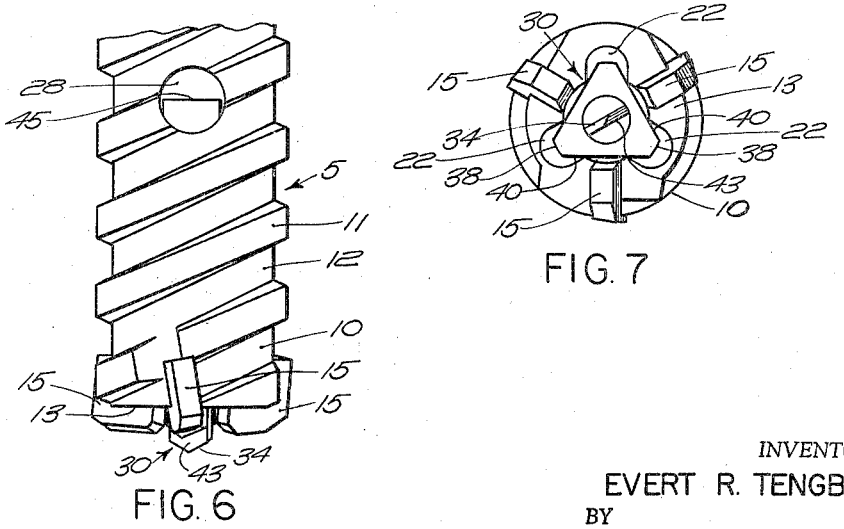
INVENTOR.
EVERT R. TENGBERG
BY
Dike, Thompson, & Sanborn
ATTORNEYS United States Patent Office 2,858,109
Patented Oct. 28, 1958

2,858,109
MASONRY DRILL AND STARTER

Evert R. Tengberg, Peabody, Mass., assignor to New England Carbide Tool Company, Inc., Medford, Mass., a corporation of Massachusetts Application April 8, 1957, Serial No. 651,314

3 Claims. (Cl. 255—61)

This invention relates to masonry drills and more particularly to a masonry drill having a center guide hole starter.

The invention is useful in providing means to locate and hold the drill at a predetermined point on the surface of the material being drilled. Since such surfaces may include not only concrete, mortar and brick but also tile and glass of a very smooth and slippery texture, it is difficult to hold a masonry drill at a predetermined point in getting the hole started. The drill has a tendency to "walk" and to drift around on the surface unless a guide is provided.

Center guide hole starters for masonry drills have been provided in the past but they have had disadvantages. Some have been secured to the drill in opposite slits formed in the end of the drill barrel. But such means cannot be used with drill bits having odd numbers of cutting teeth because one of the odd teeth gets in the way. Others have been secured against the cutting teeth or by other means, but these have been unsatisfactory or too expensive.

It is accordingly the objective of this invention to provide an improved masonry drill and means to guide it which is particularly useful in a drill having an odd number of cutting teeth.

In the drawings which accompany the more detailed description:

Fig. 1 is an elevation view of the drill without the starter, in a position for drilling downwardly.

Fig. 2 is a longitudinal elevational section taken on the lines 2—2 of Fig. 1.

Fig. 3 is a bottom end view of Fig. 1.

Fig. 4 is a side elevation view of the starter, pointed downwardly.

Fig. 5 is a bottom end view of the starter.

Fig. 6 is an elevation view including both the drill and the starter.

Fig. 7 is a bottom end view of the drill and the starter.

Referring first particularly to Figs. 1 and 2, the masonry drill 5 according to my invention has a barrel 10 having external helical lands 11 and grooves 12 and terminating in an end face 13. A plurality of cutters 15, three as seen in Figs. 1 and 3, are received and brazed in notches cut in the periphery of the end face 13, and are radially arranged in equal circumferentially spaced relation. These cutters 15 perform the main cutting operation of the drill.

As seen in Fig. 2, the barrel 10 has an axial bore 20 extending rearwardly from the end face 13.

A recess 21 is cut in the end face 13 and it comprises three lobes 22 best seen in Figs. 3 and 7 which extend radially from the bore 20 and between the cutters 15 but short of the periphery of the end face and being enclosed thereby. The lobes 22 of the recess 21 provide shoulders 23 which are axially spaced from the end face 13 for a purpose to be described.

At the rear end of the bore 20 a longitudinal slot 25 is provided for the escape of pulverized material entering the center of the barrel 10 through the bore 20 when the drill is cutting.

A radial hole 28 is provided through the side of the barrel connecting with the bore 20 for a purpose to be described.

A shank 6 is threaded into the rear end of the barrel 10 by which it may be attached to the chuck of an electric drill (not shown).

A center hole starter 30 comprises a shank 32 formed to be received in the bore 20, a pointed cutting tip 34 preferably of carbide steel on its advanced end and a collar 35 behind the tip 34. The collar 35 has equally spaced radial extensions 38, three being shown in Fig. 5, to correspond to the lobes 22 of the recess 21. The extensions 38 of the collar 35 are received in the lobes 22 and bear on the shoulders 23 as seen in Fig. 7 when the shank 30 is inserted in the bore 20 of the drill.

The center hole starter 30 may be conveniently integrally formed from one piece except for the tip 34 by forming it from solid cylindrical stock having a diameter at least equal to a circle enclosing the extensions 38, and turning it down to form the rear shank portion 32a, and the advanced shank portion 32b, leaving the collar 35, and then grinding or cutting flats 40 and 41 on the collar 35 as seen in Fig. 5. A longitudinal saw kerf 43 may be cut in the end of the shank portion 32b to receive the carbide tip 34 which is then brazed therein. The center hole starter 30 may be conveniently formed in other ways.

The hole 28 in the barrel 10 is located opposite the rear end 45 of the starter 30 when the shank 32 is inserted in the bore 20, thereby providing means by which the shank 32 may be started out of the bore when it has become stuck therein due to accumulation of pulverized material between the walls of the bore 20 and the shank 32.

In operation the starter 30 is seated in the barrel 10, and with the drill 5 inserted in a chuck of a suitable electric drill, the center hole may be started by means of the cutting tip 34. Drilling is continued with the starter 30 until the main hole is well started by the cutters 15 of the drill 5. Thereafter, the drill starter 30 is removed and drilling is continued with the drill 5 without the starter 30.

The great advantage of my drill and starter combination is that the starter 30 is suitably and firmly engaged to the drill 5 particularly in a drill arrangement having an odd number of cutter teeth 15 as illustrated, in which arrangement opposite saw kerfs cannot readily be cut for engagement of the starter in the end of the drill because of the interference of the cutter teeth 15. The lobes 22 of the recess 21 may be conveniently and cheaply formed by using a drill or an end mill or both. By making the tip 34 of the starter 30 small enough in diameter, cost is saved and the pilot hole may be that much more readily drilled in advance of the larger hole. The diameter of the tip 34 is preferably smaller than the diameter of a circle inside of the cutters 15.

I claim:

1. A masonry drill comprising a barrel terminating in an end face, a plurality of cutters received and secured in the periphery of the end face and radially arranged in equal circumferentially spaced relation, said barrel having an axial bore extending rearwardly from the end face, a recess in the end face, said recess having lobes extending radially from the bore between the cutters but short of the periphery of the end face and providing shoulders axially spaced from the end face, and in combination therewith a center hole starter comprising a shank formed to be received in the bore, a cutting tip on its advanced end and a collar behind said tip, said collar having equally spaced radial extensions corresponding to said lobes, said extensions being received in said lobes and bearing on said shoulders when the shank is inserted in the bore.

2. A masonry drill comprising a barrel having external lands and grooves and terminating in an end face, three cutters received and secured in the periphery of the end face and radially arranged in equal circumferentially spaced relation, said barrel having an axial bore extending rearwardly from the end face, a recess in the end face, said recess having three lobes extending radially from the bore between the cutters but short of the periphery of the end face and providing shoulders axially spaced from the end face, and in combination therewith a center hole starter comprising a shank formed to be received in said bore, a cutting tip on its advanced end and a collar behind said tip, said collar having three radial equally spaced extensions, said extensions being received in said lobes entirely below said end face and bearing on said shoulders when the shank is inserted in the bore, said collar being spaced from the tip so that the tip extends axially beyond the cutters.

3. A masonry drill comprising a barrel terminating in an end face, an odd number of cutters received and secured in the periphery of the end face and radially arranged in equal circumferentially spaced relation, said barrel having an axial bore extending rearwardly from the end face, a recess in the end face, said recess having lobes extending radially from the bore between the cutters but short of the periphery of the end face and providing shoulders axially spaced from the end face, and in combination therewith a center hole starter comprising a shank formed to be received in the bore, a cutting tip on its advanced end and a collar behind said tip, said collar having also a like odd number of equally spaced radial extensions corresponding in number to said lobes, said extensions being received in said lobes and bearing on said shoulders when the shank is inserted in the bore.

References Cited in the file of this patent

UNITED STATES PATENTS

| | | |
|---|---|---|
| 1,401,353 | Murray | Dec. 27, 1921 |
| 2,341,237 | Phipps | Feb. 8, 1944 |
| 2,673,717 | Bacon | Mar. 30, 1954 |